United States Patent [19]

Hunkeler

[11] 3,964,369

[45] June 22, 1976

[54] LARGE GEAR MANUFACTURE

[75] Inventor: Ernst J. Hunkeler, Fairport, N.Y.

[73] Assignee: The Gleason Works, Rochester, N.Y.

[22] Filed: Oct. 6, 1975

[21] Appl. No.: 619,885

[52] U.S. Cl. .................................. 90/5; 90/3
[51] Int. Cl.² ................................. B23F 9/10
[58] Field of Search ......................... 90/5, 3, 9.4

[56] References Cited
UNITED STATES PATENTS

| | | | |
|---|---|---|---|
| 2,895,385 | 7/1959 | Carlsen et al. | 90/6 |
| 2,913,962 | 11/1959 | Carlsen et al. | 90/5 |

*Primary Examiner*—Gil Weidenfeld
*Attorney, Agent, or Firm*—Morton A. Polster

[57] ABSTRACT

Large, coarse pitch gears are cut by a method utilizing incremental plunge-fed or incremental generation motions and a special circular face-mill type cutter having cutting blades spaced apart from each other at angular distances selected so that, when cutting a tooth slot, there can be intervals during the rotation of the cutting tool when no blade is engageable with the workpiece. It is only intermittently, during these short, no-cutting intervals, that required plunge feed or generating motions are made. At other times, i.e., when one or another of the cutting blades is engaged with the workpiece, the machine elements which are moved intermittently relative to each other to provide in-feed or generation, e.g., the oscillating cradle, rotating work-head, and sliding base, are all rigidly clamped to the machine base and to each other. In the preferred embodiment of the machine for carrying out this method, clamping means including the sliding base as well as overhead tie-bar arrangements straddle the workpiece and cutter to achieve exceptional rigidity.

13 Claims, 6 Drawing Figures

LARGE GEAR MANUFACTURE

This invention relates to the cutting of tooth slots in spiral and hypoid gears by rolling generation using a continuously rotating face mill cutter and, more particularly, relates to the cutting generation of large, coarse pitch gears.

BACKGROUND OF THE INVENTION

Cutting large gears a economically satisfactory rates involves very heavy chip loads which, in turn, impose heavy forces on various elements of the cutting machine structure. In particular, the cutting chip loads impose intermittent torsional loads of heavy magnitude on the generating train which provides the timed driving connection between the oscillation of the machine's cutter-supporting cradle and the rotation of its workpiece-supporting work spindle. Since these loads vary in magnitude and occur intermittently as each cutting blade of the cutter abruptly engages and disengages the cut, intermittent winding and unwinding of the generating train is induced due to the backlash in the several gear meshes within the train and the torsional resilience of the connecting shafts. This wind-unwind action is not only reflected by the cutting blade in the cut, causing chatter, poor cutter life, and unacceptable surface finish in the rough cut parts, but it also imposes high stresses on the elements of the generating train.

It has heretofore been common to use cradle and work spindle brakes and other similar apparatus to reduce the adverse effects of the very heavy chip loads involved. However, when cutting gears of large diameter and coarse pitch, such solutions are only satisfactory if the rate of infeed of the tool is slowed to keep chip loads relatively light, thereby resulting in low production rates. Heretofore, such large gears have generally been cut with planing generators in which the cutting tool strokes through the tooth slot being cut in an essentially linear path. Such machines are relatively slow and attempts to increase their production rates have been thwarted by their inability to cut large gears and tooth slots of acceptable quality at higher speeds.

BRIEF SUMMARY OF THE INVENTION

The invention herein provides a method and means for attaining acceptable tooth quality while cutting generated teeth in large gears at much higher production rates than previously possible. The method is based upon the concept of incremental rolling generation and uses a rotating face mill cutting tool with cutting blades spaced apart so that there can be intervals during the rotation of the tool when no cutting blade is engageable within a tooth slot of the workpiece. It is only during these short intervals in the cutting process that the incremental rolling generation occurs. Whenever a cutting blade is in cutting engagement with the workpiece, the rolling generation motion is stopped and rigidity of the machine is greatly increased by clamping the cradle to the cradle housing and, similarly, clamping the work-holder to the work-head.

By firmly clamping the cradle and work-holder against rotation between each of the incremental rolling generation steps, the generating train is relieved of the cutting loads while the successive cutting blades are engaging the work, and cutter life is greatly improved. In addition, the surface finish of parts cut according to the invention is also significantly improved.

The invention also contemplates an incremental, stepping-type of advance in those cases in which it is desired to plunge the cutter into the workpiece prior to initiation of the generating roll. This additional feature is somewhat similar to a linear infeed disclosed in U.S. Pat. No. 2,895,385 on a machine for cutting straight bevel gears with linearly reciprocating tools. More specifically, during this plunge cut i.e., the linear infeed movement of the cutter relative to the work, the cradle and work-head are rigidly clamped against vibration and movement whenever a blade of the cutter is engaging the workpiece and then, during the interval following each cut, an increment of linear infeed is continued, the machine being clamped again as the next successive blade moves into cutting engagement.

As part of the preferred embodiment of the invention, even greater rigidity is achieved during each clamping step by clamping the work-head and cradle to each other by means which straddle the workpiece and cutter. In the embodiment shown, this straddling clamp means includes the sliding base and an overhead tie-bar arrangement.

IN THE DRAWINGS

Figure 4:
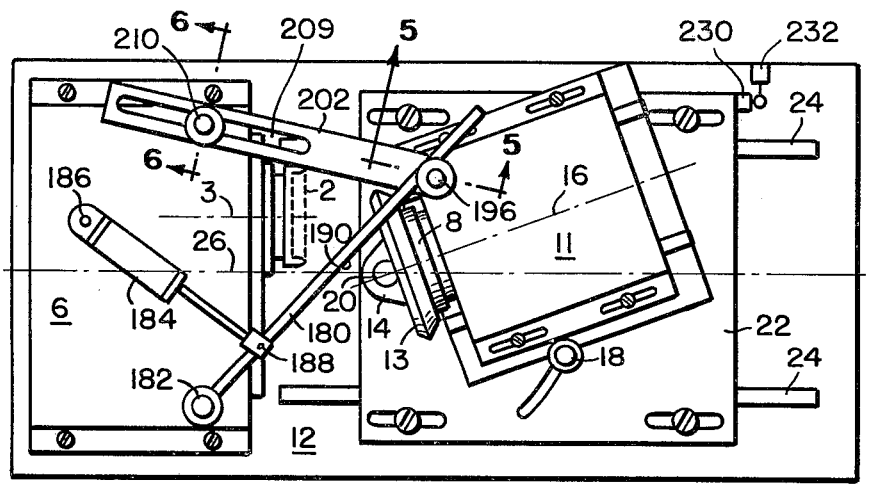
FIG. 4 is a schematic plan view of the machine of FIGS. 1 and 2 showing in more detail the upper, tie-bar portion of the workpiece-straddling clamping feature of the invention.
Figures 5, 6:
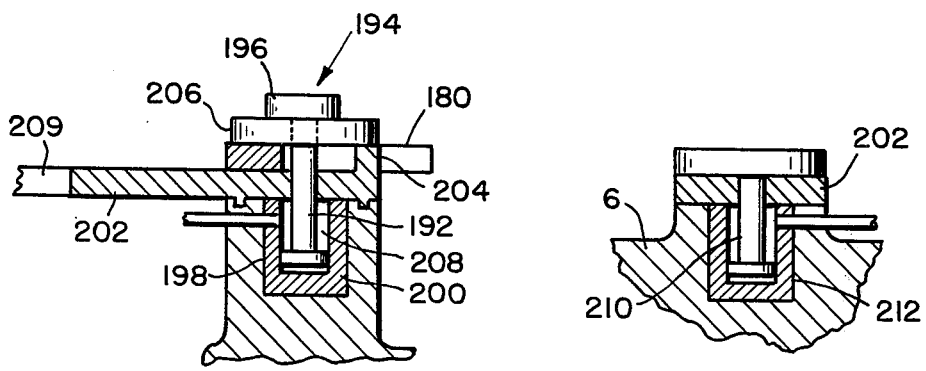

FIGS. 5 and 6 are partial section views taken along lines 5—5 and 6—6, respectively, of FIG. 4.

DETAILED DESCRIPTION OF THE INVENTION

Figure 1:
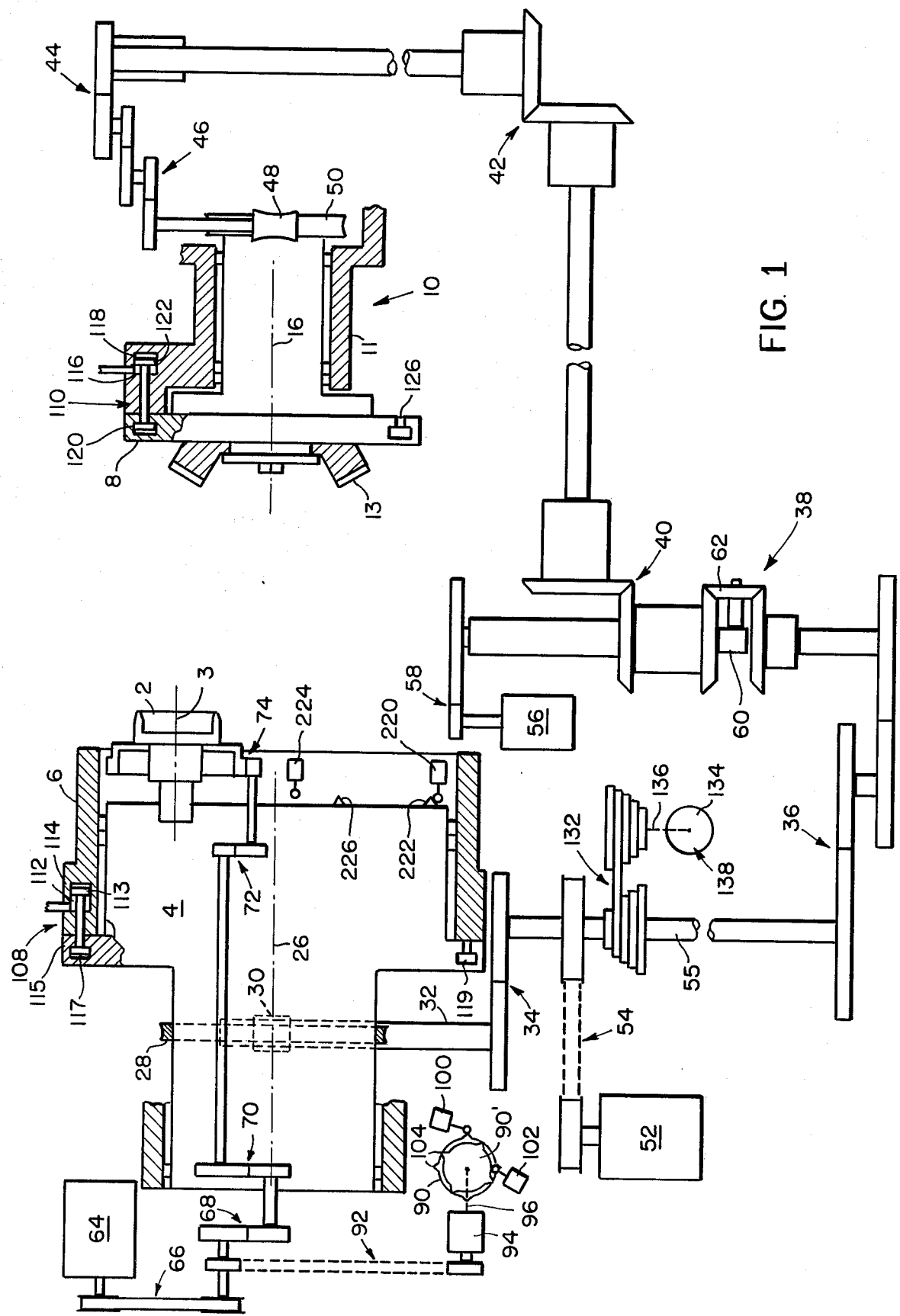
FIG. 1 is a schematic diagram showing the basic elements of a gear generating machine according to the invention, including the generating train, means for clamping cradle and work spindle, and means for timing the generating and infeed step increments.
Figure 2:
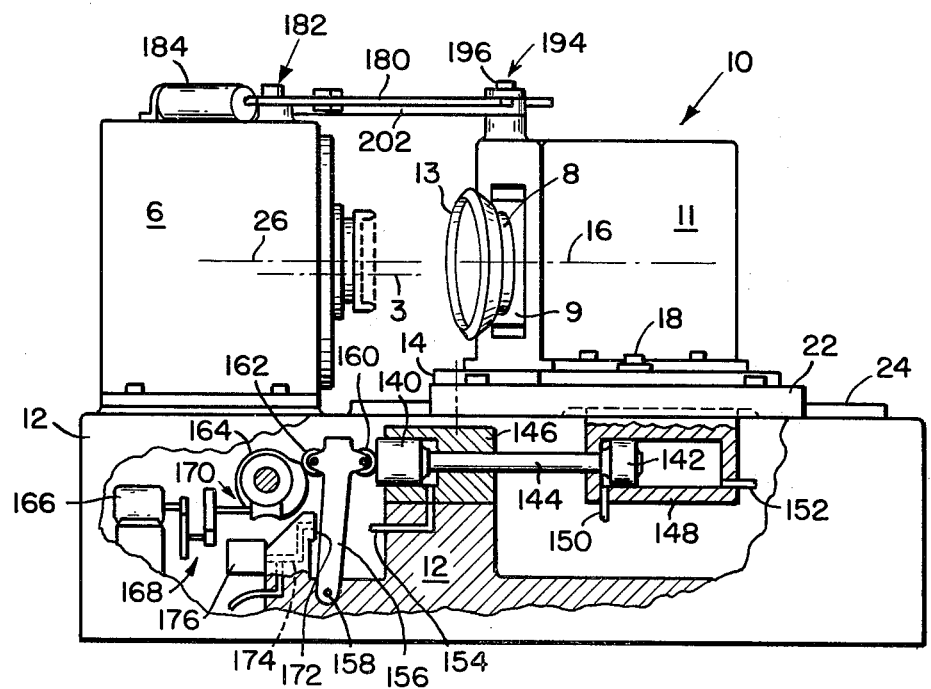
FIG. 2 is a schemtic elevation view of the machine of FIG. 1, partially sectioned to show means providing for incrementally stepped infeed and means for effecting the workpiece-straddling clamping of the workhead to the cradle housing.

Referring to the gear generating machine schematically illustrated in FIGS. 1, 2 and 4, a face mill cutting tool 2 is mounted for rotation about axis 3 in a cradle 4 which is oscillatable within a cradle housing 6 about axis 26. Cradle housing 6 is fixed to the machine base 12. In a work-head(generally indicated at 10), a workholder 8, rotatably supported in a slide 9, carries the workpiece 13.

Slide 9 is vertically adjustable and rigidly clamped within column 11 which, in turn, is attached to a swinging base 14 for adjustment on the swinging base in the direction of work-holder axis 16 (FIG. 4). Swinging base 14 is adjustably attached by means of a slot and bolt arrangement at 18 and pivoted at 20 to a sliding base 22, the latter being slidably mounted on slides 24 of machine base 12 to permit the workpiece to be advanced and withdrawn, relative to the cutting tool and the cradle housing, along a linear path parallel to cradle axis 26.

FIG. 1 shows a generally conventional generating train of gearing connecting cradle 4 and work-holder 8 for timing their respective oscillation and rotation. Tracing this train: Beginning at cradle 4, a worm gear 28 is affixed to the cradle for rotation therewith. Engaging worm gear 28 is driving worm 30 rotatably connected to shaft 32. The train further comprises gears 34, ratio change gears 36, index differential 38, bevel gear pairs 40 and 42, gears 44, index change gears 46, worm 48, and worm wheel 50, the latter being fixed to work-holder 8. A reversible, variable speed motor 52 drives the generating train through a belt and pulley arrangement 54. Also connected to the generating train is an index drive motor 56 driving, through gears 58, shaft 60 which carries the planet pinion or pinions 62 of the index differential 38.

A motor 64 drives rotatable face mill cutter 2 through variable speed belt-and-pulley arrangement 66 and gear pairs 68, 70, 72 and 74.

Figure 3:
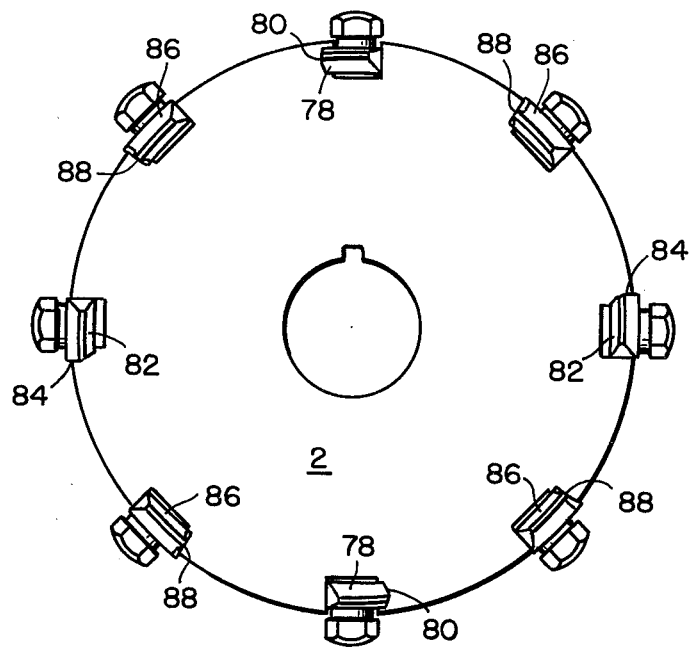
FIG. 3 shows in greater detail a face mill cutter used with the machine of FIGS. 1 and 2.

FIG. 3 illustrates cutter 2 in greater detail. It can be seen that cutter 2 is similar to a type of face mill cutter generally well known in the art, except that it includes many blades less than is normal. The cutter illustrated has two inside blades 78, which cut on the inside edges 80 of their front-sharpened faces, and two outside blades 82, which cut on the outside edges 84 of their front-sharpened faces. Also included are four bottom-cutting blades 86 which cut only with the tips 88 of their front-sharpened faces. (NOTE: It may sometimes be possible to omit the special bottom-cutting blades, using only inside and outside, i.e., "side-cutting", blades.) For carrying out the method of the invention, the blades must be spaced apart sufficiently on the cutter periphery to assure that there will be intervals during cutting operations when no blade is engaged with the workpiece. It is during each such interval that the generating train is unclamped and makes an incremental step of rolling generation.

Thus it will be appreciated that the required spacing of the cutting blades is related (a) to the tooth slot length of the workpiece being cut, (b) to the time interval of a rolling step, as well as (c) to the peripheral speed of the cutter. In certain cases it might not be objectionable to have a very brief moment of engagement of a cutting blade during the rolling step, but only if such engagement does not continue long enough to build up significant chip loads. In some cases, it might also be acceptable to vary the method by permitting a brief portion of the total generating roll to be continuous rather than incremental, such as, at the end of the roll when chip loads are lighter, since such a minor variation could save valuable cutting time. It should be specially noted that the method does not necessarily require interruption of the generating roll when bottom-cutting blades 86 are in the cut, since these blades do not generally exert forces which produce heavy torsional loads on cradle and work-holder.

It is, of course, essential that the rotational positioning of the cutter relative to the workpiece tooth slot be correctly timed both with the increment steps of the generating motion and with the clamping of cradle and work-holder. In FIG. 1, cutter-drive motor 64 drives two co-axial and co-rotatable synchronizing cams 90, 90' through gearing 92, a speed reducer 94, and a shaft 96. (For clarity, cams 90, 90' are shown rotated 90° in an axial plane of shaft 96, perpendicular to the drawing plane.) The synchronizing cam drive ratio is made the same as the overall cutter drive ratio so that cams 90, 90' and cutter 2 rotate synchronously. Radially spaced lobes 104 of cams 90 and 90' actuate switches 100 and 102 which, respectively, initiate and terminate various intermittent machine motions and clamping arrangements in timed relation to the engagement of cutter blades with the workpiece. For instance, switch 102 starts drive motor 52 through generally conventional control means (not shown), while switch 100 stops drive motor 52. Angular spacing of the individual cam lobes 104 is the same as that of side cutting blades 78, 82 of the cutter.

The same synchronizing cams and switches serve also to actuate hydraulic clamps 108, 110 on cradle 4 and work-holder 8, respectively, through suitable solenoid valve means (not shown). Switch 100 actuates both clamps, while switch 102 deactivates, i.e., releases both clamps. To clamp cradle 4 against rotation, clamp 108 is actuated by pressurizing chamber 112 of cylinder 114, which clamps the flange 115 of cradle 4 to cradle housing 6, by means of a piston 113 which is integral with a collar 117 slidable within a T-shaped annular groove 119, as shown.

Clamp 110 is actuated, by pressurizing chamber 116 of cylinder 118, to clamp work-holder 8 to work-head 10 to prevent work-holder rotation. Clamping collar 120 is effectively integral with piston 122, the collar being slidable within the T-shaped annular groove 126 in the work-holder during rotation of the latter.

The speed of motor 52, which controls the rolling generation motions, must be adjusted relative to the speed of motor 64, which controls the speed of rotation of cutter 2. Those skilled in the art will appreciate that the ratio of these two motor speeds determines the chip load as well as the width of generating flats on the tooth surfaces. Also shown in FIG. 1 is a mechanism for facilitating the adjustment of this ratio of cutter speed to magnitude of the rolling increment steps. A set of small selectable pulley combinations 132 are driven from shaft 55 and connect to an indicator plate 134 by means of a shaft 136. The plate has an indicator mark 138. The operator selects a pulley combination appropriate for the cutting ratio desired, and then adjusts the speed of motor 52 until plate 134 makes exactly one full revolution for each rolling increment step. In the event of any variation in the established speed of motor 52, the operator will note indicator mark 138 creeping away from its established stationary reference and can adjust the speed of motor 52 accordingly. Of course, some amount of such creeping can be tolerated due to the high ratios of the respective gearing 28, 30 and 48, 50 in the cradle and work spindle drives.

To speed up the cutting operation when generating very large gears, a plunge cut is often used to remove stock prior to the initiation of the generating roll, and the preferred form of the invention includes an incrementally stepped plunge cut in which the infeed advance of the cutter relative to the workpiece occurs only during intervals when no blade is cutting, the machine being intermittently clamped for maximum rigidity whenever a blade is in plunge-cutting engagement with the workpiece.

Referring more specifically to FIG. 2, apparatus is shown for effecting the slidable advance and withdrawal of workpiece 13 along a linear path relative to cutting tool 2 in the direction of cradle axis 26. The apparatus includes two pistons 140 and 142 fixedly connected coaxially by a shaft 144. Piston 140 is movable within a cylinder 146 which is fixed to machine base 12. Piston 142 is movable within a second cylinder 148 which is adjustably attached to sliding base 22. Pressure is applied via conduit 150 or 152 to cause cylinder 148 to slide to the right or left, respectively (in FIG. 2), relative to piston 142, the latter's position being relatively stationary under the control of piston 140. A manually operated control (not shown) selectively delivers pressure to conduits 150 or 152 to withdraw or advance the sliding base between a "load-unload" position and a "start feed-advance" position.

Cylinder 146 is under constant pressure, via conduit 154, urging piston 140 continuously toward the left. A pivot arm 156, pivoted to machine base 12 at 158, carries rollers 160 and 162 which engage, respectively, piston 140 and an interchangeable feed cam 164. The cam is mounted within the machine base structure for rotation by a motor 166 through gearing 168 and 170. A positive stop surface 172, integral with base 12, limits the counterclockwise travel of pivot arm 156. Opening into the stop surface is a hydraulic conduit 174 connecting with a pressure switch 176 which senses the "full depth" position of infeed to initiate the generating roll motion. The position of the sliding base thus remains under the control of cam 164 until the full leftward position of the base is established by engagement of pivot arm 156 with positive stop surfaces 172, at which time there is a small clearance between cam 164 and roller 162.

The structure just described does more than control the infeed advance for plunge cutting, since it also functions as a lower clamping assembly. It is essential to note that at all times during tooth cutting, sliding base 22, to which the work-head is adjustably fixed, is continuously urged leftward by pressure in cylinder 146 to maintain pivot arm 156 in tight engagement with either cam 164 or positive stop surface 172. This forms an effective clamped connection between work-head 10 and cradle housing 6 and provides a rigid support beneath the workpiece.

In addition to a rigid support beneath the workpiece, the preferred form of the invention includes additional clamping means above the workpiece, thereby providing an effective straddling support structure of unusual rigidity. Means will now be described for maintaining such rigid support during cutting while still permitting incremental infeed advance during intervals when no blade is cutting.

The overhead clamping structures are shown in partially schematic side and plan views in FIGS. 2 and 4. These structures comprise a tie-bar arrangement including a pair of links 189, 202, each having a pivot end and a free, or sliding, portion. The pivot end of link 180 connects to the cradle housing at 182 and is continuously biased in a clockwise direction about pivot 182 by a pressured piston-cylinder 184 which, in turn, is pivotally connected to both cradle housing 6 at pivot 186 and to link 180 at pivot 188. Clockwise movement of first link 180 is restrained by the bearing of an edge 190 of its sliding portion against a pin 192 of clamp 194 (shown in detail in FIG. 5). Pin 192 has an integral head 196 at its top end, and at its bottom is fixed to a piston 198 in a clamping cylinder 200.

First link 180 rests on second link 202 which, in turn, is supported by and pivotally attached to column 11 around pin 192. Second link 202 has an approximately semi-circular upwardly projecting lip 204 serving as a fulcrum support for a clamp collar 206 which firmly clamps links 180 and 202 against movement relative to the work head when clamping force is exerted by pin head 196 upon introduction of pressure to the upper chamber 208 of clamping cylinder 200.

The sliding portion of link 202 has an elongated slot 209 permitting it to slide and oscillate relative to a piston clamp 210 (see detail in FIG. 6) which moves in a cylinder 212 fixed to cradle housing 6. Pressuring the top chamber 214 of cylinder 212 serves to clamp link 202 rigidly to the cradle housing against sliding or oscillation.

In a manner similar to that described above in relation to the intermittent clamping of cradle 4 and work-holder 8, actuation of the clamping means portions of the tie-bar arrangement is also timed by synchronizing cams 90, 90' to provide clamping when blades are cutting while permitting incremental infeed movements to be made during the intervals in the plunge cutting operation when no blades is engaged with the workpiece. (NOTE: Although the incremental infeed and rolling generation movements have been described as occurring only when no blade is engaged with the workpiece, as noted above, attention is again called to the fact that it is possible to carry out the invention so long as no "side-cutting" blades are so engaged. That is, the incremental motion can, in some cases, be permitted while "bottom-cutting" blades are cutting.)

The intermittent clamping disclosed herein provides great rigidity during cutting and, in the preferred embodiment, even greater rigidity is achieved by means of the just-described workpiece-straddling connections effectively clamping the work-head to the cradle housing. Such rigidity, coupled with the incremental generating and feed motions of the invention, results in improved productivity and improved quality in large bevel or hypoid gear generation.

Operation of the disclosed apparatus in a typical tooth cutting cycle can be summarized as follows:

A. After the machine is loaded by securely mounting workpiece 13 to work-holder 8, sliding base 22 is advanced by manual operation of a valve (not shown) applying pressure through conduit 150 to move cylinder 148 until it abuts the end of piston 142. This places sliding base 22 in its "start feed-advance" position with roller 162 of pivot arm 156 against the high point of feed control cam 164.

B. Feed cam motor 166 is now operated intermittently under the control of limit switches 100 and 102 in accordance with their actuation by synchronizing cams 90, 90'. This results in the incremental step advance of the sliding base, such base advance movement taking place when no blades are cutting. During this initial plunge cut operation, cradle clamp 108 and work-holder clamp 110 remain clamped, while overhead clamps 194 and 210 of the tie-rod arrangement are appropriately actuated intermittently by means (not shown) responsive to switches 100 and 102 in synchronism with operation of feed cam 164.

C. When sliding base 22 reaches its full depth position, pivot arm 156 contacts positive stop 172 and actuates pressure switch 176. This stops feed cam motor 166 and causes the overhead tie-bar clamps to stay clamped. At the same time, generating train motor 52, cradle clamp 108 and work-holder clamp 110 are made responsive to switches 100 and 102 for synchronous intermittent operation.

D. Completion of the intermittent rolling generation of a tooth slot in workpiece 13 is signalled when a limit switch 224 (see FIG. 1) is contacted by a cam 226 carried on oscillating cradle 4. Actuation of limit switch 224 results in (a) the release of the overhead tie-bar clamps, (b) reversal of generating train motor 52, and (c) actuation of feed cam motor 166, rotating feed cam 164 to move the sliding base back until it reaches its "start feed-advance" position.

E. When sliding base 22 is withdrawn far enough to allow the blades of cutter 2 to clear workpiece 13, a limit switch 232 (See FIG. 4) is contacted by a cam 230, and motor 56 is energized, causing the workpiece to be indexed into position for cutting the next tooth slot.

F. Generating train motor 52 runs continuously in the reverse, or "return roll" direction until cradle 4 is oscillated back to its "start roll" position. At this point, a limit switch 220 (FIG. 1) is contacted by a cam 222 carried on cradle 4, and the tooth generating process repeats once again (See step "B" above, et seq.).

G. After all the teeth have been cut in the workpiece, pressure is applied through conduit 150 of cylinder 148 to drive piston 142 and sliding base 22 to the "load-unload" position.

It will be appreciated by those skilled in the art that the preferred operation just described can be varied, e.g., the initial plunge feed can be omitted, with all cutting taking place only during the "clamped-up" intervals occurring between the intermittent steps of incremental rolling generation.

What is claimed is:

1. In the known generating roll method for producing a bevel or hypoid gear by (a) cutting a workpiece with a rotating face-mill cutter supported by a cradle oscillating in a cradle housing and having a plurality of radially disposed blades spaced from each other, and (b) rotating the workpiece in a work-holder in timed relation to the oscillation of the cradle during the generation of each gear tooth slot, the improvement comprising the steps of:
   spacing the cutter blades so that there can be intervals during tooth slot generation when no blade is in cutting engagement with the workpiece,
   interrupting the generating roll and clamping the work-holder and cradle to prevent, respectively, rotation and oscillation thereof whenever a blade is in cutting engagement with the workpiece, and
   continuing said generating roll by incrementally rotating the workpiece and oscillating the cradle only when no blade is in cutting engagement with the workpiece.

2. The method of claim 1 including the further steps of
   advancing the work-holder linearly relative to the cradle to provide infeed prior to the generating roll, and
   interrupting said infeed and clamping the work-holder and the cradle housing to prevent relative movement therebetween whenever a blade is making cutting engagement with the workpiece.

3. The method of claim 1 wherein said blades are both bottom-cutting and side-cutting and said clamping step is only carried out whenever side-cutting blades are in cutting engagement with the workpiece.

4. In a machine for producing bevel or hypoid gears by the generating roll method, including a rotatable face-mill cutter supported by a cradle oscillatable in a cradle housing, said cutter having a plurality of radially disposed blades spaced from each other, a work-holder rotatable in a work-head for receiving and holding workpiece, and drive means for oscillating the cradle in timed relation to the rotation of the work-holder to provide the relative movement of cutter and workpiece required for generation of tooth slots in the workpiece, the improvement wherein:
   said cutter blades are spaced so that there can be intervals during said generation when no blade is in cutting engagement with the workpiece,
   and further comprising:
   first releasable clamping means for rigidly clamping the work-holder and cradle to prevent, respectively, rotation and oscillation thereof, and
   synchronizing means for controlling the operation of said drive means and said first clamping means in timed relation to the rotation of said cutter so that,
   whenever a blade is in cutting engagement with the workpiece,
   said relative generation movements are stopped and
   said first clamping means is actuated, and
   when no blade is in cutting engagement with the workpiece,
   said first clamping means is released and
   said drive means continues the generation movements.

5. The machine of claim 4, including infeed means for moving said work-head in a linear path relative to the cradle to provide infeed of the cutter relative to the workpiece prior to said generation movement, further comprising
   second releasable clamping means for clamping the work-head to the cradle housing to prevent relative movement therebetween, and wherein
   said synchronizing means intermittently actuates said infeed means and second clamping means during infeed to clamp the work-head and cradle whenever a cutting blade is engaged with the workpiece and to release the work-head to continue infeed of the cutter relative to the workpiece during the intervals when no blade is in cutting engagement with the workpiece.

6. The machine of claim 5 wherein the actuation of said second clamping means effectively clamps the work-head and cradle housing to each other at separated locations straddling the work-holder and cradle.

7. The machine of claim 5 wherein said radially disposed cutter blades are both side-cutting and bottom-cutting, and wherein said synchronizing means only actuates said first and second clamping means whenever a side-cutting blade is engaged with the workpiece.

8. The machine of claim 4 wherein said synchronizing means comprises cam means movable in timed relation to the rotation of said cutter and having lobes spaced in accordance with the angular spacing of said cutter blades, and switch means responsive to the movement of said cam lobes for intermittent actuation thereby.

9. The machine of claim 6 wherein said second clamping means comprises
   a portion of said infeed means which continuously supports said work-head in clamped relation to the cradle housing below the cradle and work-holder, and
   an overhead tie-bar arrangement.

10. The machine of claim 9 wherein said overhead tie-bar arrangement comprises first and second links each having a pivot end and a sliding end, the pivot ends of said first and second links being pivotally attached, respectively, to said cradle housing and to said work-head, the sliding end of said first link being slidably received in a first releasable clamp fixed to the work-head and the sliding end of the second link being slidably received in a second releasable clamp fixed to the cradle housing.

11. The machine of claim 10 wherein the pivot end of said second link is so releasably clamped by said first clamp.

12. The machine of claim 11 wherein said first clamp comprises a hydraulic cylinder fixed to the work-head with a piston therein having a pin fixed thereto, and the pivot end of the second link is pivotally mounted to said pin.

13. The machine of claim 12 further comprising means for biasing said first link to hold one edge of its sliding end in engagement with said pin.

* * * * *